Figure 1:
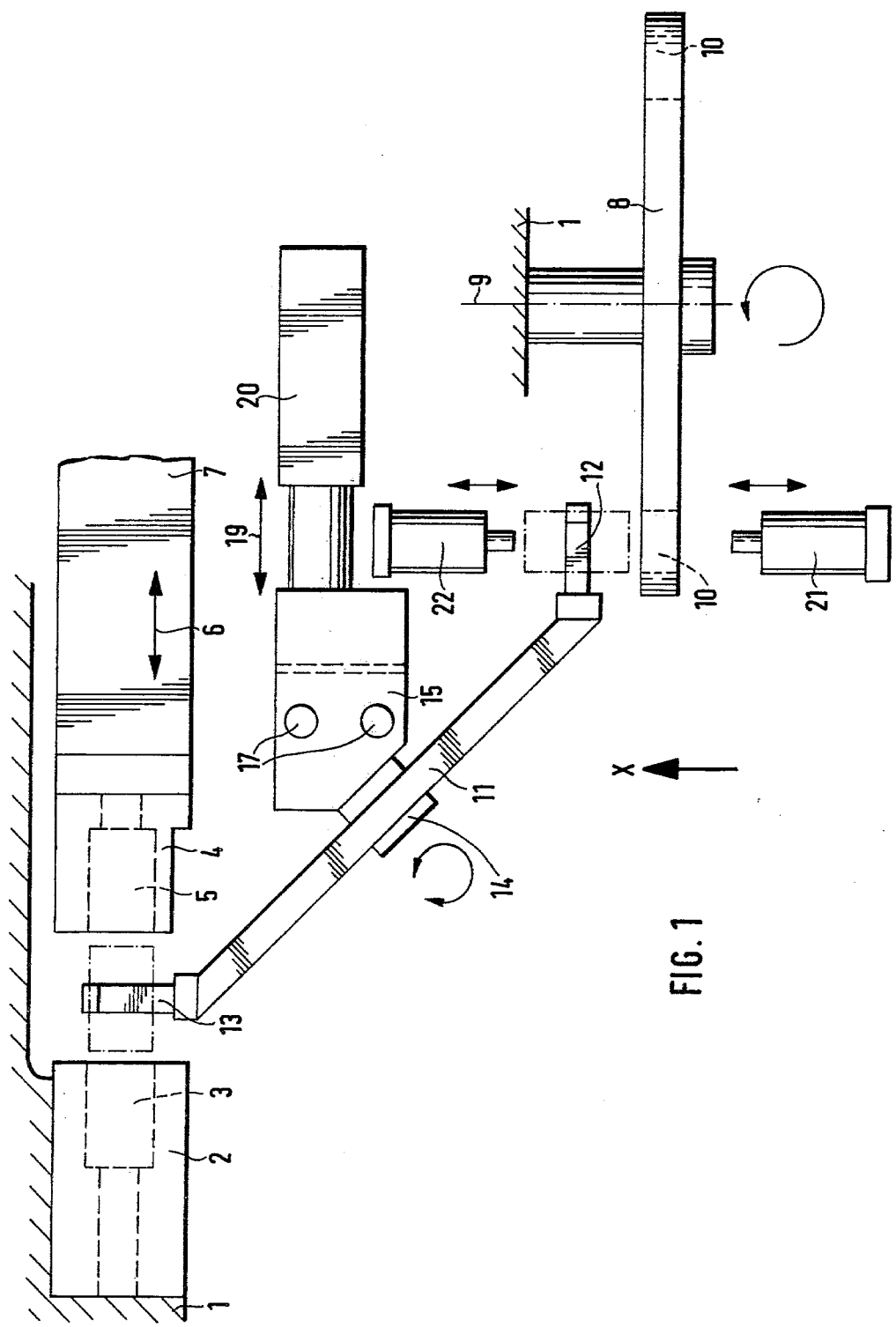

United States Patent [19]

Koch et al.

[11] 4,205,427
[45] Jun. 3, 1980

[54] MULTIPLE STAGE PRESS

[75] Inventors: Friedrich-Karl Koch, Krefeld; Walter Flamme, Wegberg-Beeckerheide, both of Fed. Rep. of Germany

[73] Assignee: Peltzer & Ehlers, Krefeld, Fed. Rep. of Germany

[21] Appl. No.: 867,482

[22] Filed: Jan. 6, 1978

[30] Foreign Application Priority Data

Jan. 7, 1977 [DE] Fed. Rep. of Germany ....... 2700502

[51] Int. Cl.² .............................................. B23Q 3/155
[52] U.S. Cl. ......................................... 29/568; 72/446; 414/736; 414/738; 414/753
[58] Field of Search ..................... 29/568; 72/446, 447; 214/1 BB, 1 BC, 1 BD; 414/736, 738, 739, 740, 741, 744 A, 751, 753

[56] References Cited

U.S. PATENT DOCUMENTS

| | | | |
|---|---|---|---|
| 3,727,442 | 4/1973 | Ridgway et al. | 29/568 X |
| 3,765,291 | 10/1973 | Stenfeld | 29/568 X |
| 3,816,904 | 6/1974 | Herb | 29/568 |

*Primary Examiner*—Z. R. Bilinsky
*Attorney, Agent, or Firm*—Shlesinger, Arkwright, Garvey & Dinsmore

[57] ABSTRACT

A multiple stage press of the type having a plurality of punches and dies mounted in substantially parallel planar die sets and including a tool changing mechanism comprising a magazine for holding the tools, a transfer mechanism movable for carrying tools from the magazine to the die sets and from the die sets to the magazine, the transfer mechanism including a gripper arm pivotable about an axis inclined relative to the planes of the die sets, the gripper arm being mounted on a slide so as to be rectilinearly movable parallel to the planes of the die sets, whereby a tool carried by the gripper arm may be positioned between the die sets.

8 Claims, 2 Drawing Figures

MULTIPLE STAGE PRESS

The invention relates to a multiple stage press with punches and dies mounted in die sets, in particular in one plane.

Such multiple stage presses have reached a relatively high level of development and make great operating speeds possible. The utilization of the great operating speed is impaired by the fact that it takes undesirably too much time to exchange single or several worn tools since dies and punches are usually mounted in die sets which can ony be changed by mechanical means such as a crane. This means that if one tool is worn, all dies or all punches must be replaced at the same time, the worn ones as well as the ones still usable. Such a complete tool change is uneconomical when only a single tool has become unusable. For this reason the dies are usually changed only when the entire press must be changed over to another set of dies. The disadvantage this involves is that worn tools are continued to be used in some cases and that the quality of the work produced is correspondingly less satisfactory.

It is an object of the invention to provide a multiple stage press in which one or several tools can be changed automatically singly or successively as needed. In accordance therewith it is also possible to change all tools automatically in succession when making a new press setup.

This problem is solved by a multiple stage press of the kind described at the outset and characterized by a tool changing device with a magazine to receive the tools to be changed and with at least one transfer system movable between the punches or dies and the magazine. In particular, the transfer system may contain a gripper arm mounted on a slide so as to be pivotable between punches and dies, and movable parallel to the punch and die plane by moving the slide, the magazine being disposed within the pivoting range of the gripper arm.

This presupposes that the individual tools be detachably retained in special seats of the punch or die sets and that the magazine keep the respectively required tools in readiness. If a certain tool is used up or worn, it can then be exchanged quickly and without difficulties. The press downtimes are thus reduced to a minimum and the great output capacity of the press can be utilized.

In particular, the gripper arm should be pivotable about an axis inclined, preferably by 45°, relative to the die plane. This has the advantage that the gripper arm can be pivoted into an active position in which it does not interfere with the operation of the press and, in particular, clears the working space between punches and dies.

If punches and dies are disposed in one plane, the slide should be movable at least parallel to the punch and die seats so that it can feed the tools taken out of the magazine to each one of the tool seats.

It is basically possible to equip the tool seats with special means which feed the worn tools to or take them from the gripper arm located in front of the tool seat. More practical, however, is an embodiment which provides for the slide, possibly together with its ways, to be movable in the direction of the tool seats for the removal or insertion of the tools. For, the gripper arm can then take the worn tools directly out of the respective tool seat and insert a new tool in the tool seat. As a matter of course, the tool seats are equipped with tool holding devices.

The gripper arm should have, at least at one end, a gripper to pick up the tools. More expedient, however, is a gripper arm constituting a dual-armed lever which is mounted in its center and whose one arm takes the worn or used-up tool out of the respective tool seat while the other gripper arm takes a new tool out of the magazine. After pivoting the gripper arm by 180°, the used tool can be deposited in the magazine and the new tool inserted.

The magazine consists preferably of a plate which can be rotated and has several holes as tool seats, arranged on a common radius. It is advantageous to select the number of holes so that a separate tool seat is coordinated with each tool. Then a new tool is available at any time to replace a worn one. After a certain tool has been changed, the plate can be rotated so that the removed worn tool can be taken out of the magazine and replaced by a new one.

The transfer of tools between gripper arm and magazine is expediently accomplished by plug-in and/or ejection devices in the overlap area of plate and gripper arm.

A control unit for the coordination of motions of gripper arm, slide, and magazine sees to it that the tool changing mechanism goes into action only when the press is stopped and otherwise controls the entire cycle of motions from taking a new tool out of the magazine to depositing the worn tool in the magazine.

An embodiment example of the invention is explained below as illustrated in the drawing, in which FIG. 1 shows in schematic representation a plan view of a multiple stage press with a tool changing mechanism, FIG. 2 a view in direction X of the subject of FIG. 1.

Fixed to a press frame 1 is a block 2 with tool seats 3 for dies, and mounted to a press slide 7 movable in direction of arrow 6 is a block 4 with tool seats 5 for dies. Coordinated with the tool seats 3 and 5 are devices, not shown in detail, to hold the dies or punches and to at least partially eject or plug in these tools. As is evident from a comparison of FIGS. 1 and 2, the tools or tool seats 3, 5 are disposed in one plane.

Also mounted to the press frame 1 is a magazine plate 8, rotatable about an axis 9 perpendicular to the tool plane. The magazine plate 8 has several through holes 10 disposed on a common radius of the magazine plate 8. The number of holes 10 matches the number of tool seats 3 and 5 present. The holes 10 serve as tool seats for new, unused tools to be exchanged for worn tools.

This purpose is served by a gripper arm 11 which is designed as dual-armed lever, is mounted in its center and supports on both its ends a gripper 12 and 13, respectively. The gripper arm 11 is mounted to a slide 15 so as to be pivotable about an axis 14. The axis 14 is inclined by a 45° angle relative to the tool plane or the axis 9. The slide 15 contains a drive, not shown, for the pivoting motion of the gripper arm 11.

Figure 2:
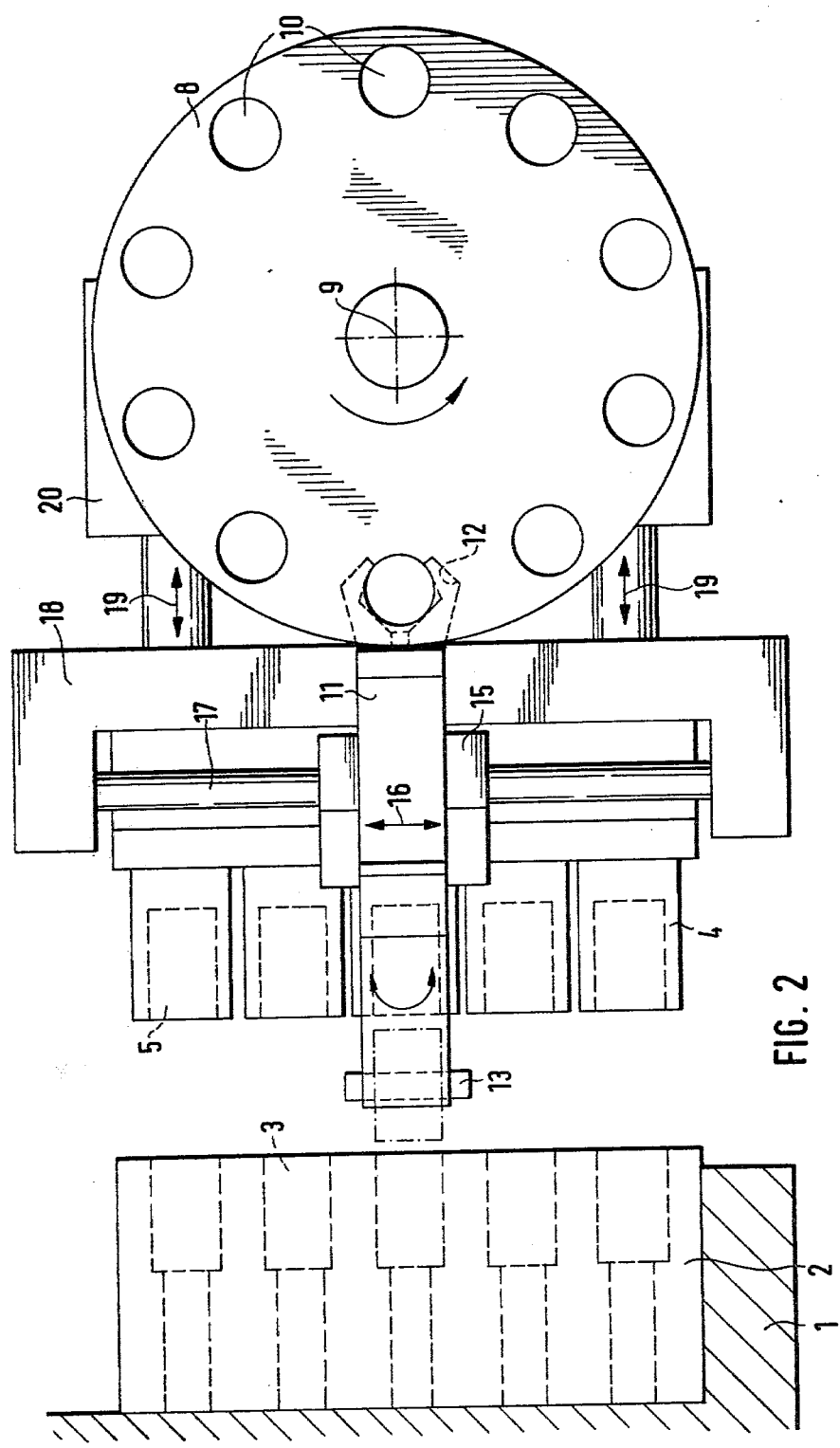

The slide 15 is movable on ways 17 in the direction of arrow 16 in a plane corresponding to the projection according to FIG. 2. This purpose is served by a not detailed drive such as a screw drive. Consequently, the slide 15 can be moved together with the gripper arm 11 parallel to the tool plane so that one of the gripper arms 12 or 13 reaches each one of the tool seats 3 and 5, respectively. Furthermore, the slide 15, together with its ways 17, is mounted in a frame 18 which, in turn, is movable in the direction of the arrows 19. This is accomplished by a drive 20 which may be a hydraulic cylinder, for example. The direction of the arrows 19 is that of the orientation of the axes of tool seats 3 and 5 so that, upon the actuation of drive 20, the gripper arm can take a tool out of the coordinated tool seat or insert it therein.

Finally, a control unit not shown is provided which coordinates the motions of the various components and controls the exchange of the tools.

The multiple stage press shown with tool changing mechanism operates as follows:

In its inactive position, the gripper arm is in a position pivoted by 90° relative to the position shown and pivots by 90° from this waiting position into the position shown. A drive system for the magazine plate 8, actuated by the control unit, rotates or steps the magazine plate in accordance with the coding until the desired tool is located in front of the gripper 12 of gripper arm 11. A plug-in device 21, disposed in the overlap area between gripper 12 and magazine plate 8, pushes the tool retained in the respective hole 10, after the release of the holder or clamp holding the tool in the hole, out of the magazine plate 8 into the gripper 12 which picks up the tool. Then the gripper arm 11 is moved by moving the slide 15 so that the other gripper 13 is located in front of the coordinated tool seat 3 or 5 containing the worn tool. The frame 18, the slide 15 and the gripper arm are moved by means of the drive 20 in the direction of arrow 19 so that the gripper 13 can pick up the worn tool and remove it from its associated tool seat after the fastening of this tool was loosened. If applicable, an ejector not shown, which may operate mechanically or hydraulically, pushes the tool into the gripper 13 which picks up the tool and pulls it completely out of the tool seat.

The gripper arm 11 subsequently pivots by 180° and moves the new tool in front of or into the coordinated tool seat. Stops may be provided to facilitate addressing the correct tool seat. Moreover, a mechanism which pulls the tool into the respective tool seat and fixes it therein may be provided for easier insertion of the new tool into the respective tool seat.

The gripper arm 11 together with the slide 15 then travels into the center position shown and transfers the worn tool into the coordinated hole 10 of the magazine plate 8. This is accomplished by an ejector 22, disposed like the plug-in device 21 in the overlap area of gripper 12 or 13 and magazine plate 8. The ejector 22 pushes the worn tool out of the gripper into the empty hole of the magazine plate 8. Therein the tool is clamped or retained.

Subsequently, the gripper arm 11 pivots by 90° into its waiting position. The magazine plate 8 rotates by approximately 180° into the loading and unloading position so that the worn tool can be removed from the magazine manually and replaced by a new one while the multiple stage press continues producing parts.

It goes without saying that the multiple stage press is stopped while one or several tools are being changed, the press slide 7 then being in its deadcenter position shown on the right in FIG. 1, and that the tool cooling system is shut off. All these functions may be controlled by the control unit which may be activated by an operator such as by pushing a button.

What is claimed is:

1. A multiple stage press of the type having a plurality of punches mounted in a substantially planar alignment and a plurality of cooperating dies mounted in a substantially planar alignment parallel to said punches and including a tool changing mechanism, said changing mechanism including
   a magazine for holding tools for said press,
   a transfer mechanism movable for carrying tools from said magazine to said punches and dies and from said punches and dies to said magazine,
   said transfer mechanism including a gripper arm pivotable about an axis inclined relative to the planes of said punch and dies
   a slide for mounting said gripper arm so that said gripper arm is rectilinearly movable parallel to the planes of said die sets whereby a tool carried by said gripper arm may be positioned between said punches and dies.

2. A multiple stage press as in claim 1 and including means for moving said slide and said gripper arm mounted so as to be toward and away from said punches and dies for inserting or removing tools therefrom.

3. A multiple stage press as in claim 2 and wherein said axis is inclined at an angle of 45° to the tool plane.

4. A multiple stage press as in claim 2 and wherein at least one end of said gripper arm includes a gripping member for picking up tools.

5. A multiple stage press as in claim 2 and wherein said gripper arm is pivotable about its midpoint and includes a gripping member on each end thereof.

6. A multiple stage press as in claim 3 and wherein said magazine comprises a plate having a plurality of tool holding recesses therein, said plate being rotatable about an axis.

7. A multiple stage press as in claim 6 and wherein the axis of rotation of said plate is inclined at an angle of 45° to the axis of rotation of said gripper arm.

8. A multiple stage press as in claim 6 and including means for moving a tool from said magazine into said gripper arm and means for moving a tool from said gripper arm into said magazine.

* * * * *